US 6,682,432 B1

United States Patent
Shinozuka

(10) Patent No.: US 6,682,432 B1
(45) Date of Patent: Jan. 27, 2004

(54) MULTIPLE SHAFT DIAMETER FLEXIBLE COUPLING SYSTEM

(76) Inventor: Kinzou Shinozuka, 1-4-7-213, Seishincho, Edogawaku, 134-0087, Tokyo (JP)

( * ) Notice: Subject to any disclaimer, the term of this patent is extended or adjusted under 35 U.S.C. 154(b) by 0 days.

(21) Appl. No.: 10/233,568

(22) Filed: Sep. 4, 2002

(51) Int. Cl.[7] ............... F16D 3/74; F16B 2/22
(52) U.S. Cl. .............. 464/78; 464/88; 403/222; 403/223; 403/290; 403/344
(58) Field of Search .............. 464/51, 78, 87, 464/88, 97, 106, 147, 153, 181, 182, 903; 403/110, 179, 221, 222, 223, 227, 286, 289, 290, 291, 344, 373

(56) References Cited

U.S. PATENT DOCUMENTS

| | | | | |
|---|---|---|---|---|
| 1,702,057 A | * | 2/1929 | Murray | 464/7 |
| 2,326,941 A | * | 8/1943 | Heitner | 403/286 |
| 3,006,663 A | * | 10/1961 | Bowne | 285/233 |
| 3,393,535 A | * | 7/1968 | Morin | 464/88 |
| 3,583,356 A | * | 6/1971 | Barker | 440/82 |
| 4,572,697 A | * | 2/1986 | Haldric | 403/344 |
| 5,941,653 A | * | 8/1999 | Cipriani | 403/344 |

* cited by examiner

*Primary Examiner*—Lynne H. Browne
*Assistant Examiner*—Kenneth Thompson
(74) *Attorney, Agent, or Firm*—Peter Gibson

(57) ABSTRACT

Compression exerted by a clamp collar integral to a molded plastic flexible shaft coupling accommodating angular shaft misalignment upon the circumferential outward surface of a radially compressible molded sleeve insert located in a shaft bore of the flexible coupling facilitates engagement of a reduced diameter shaft located within the sleeve insert. Use of a sleeve insert having a different internal diameter similarly accommodates flexible coupling to another diameter shaft. Utilization of sleeve inserts selected from a plurality of different reduced internal diameters and exterior diameters sized to fit either shaft bore enables flexible coupling of both multiple matched shaft diameters and an exponential number of differing opposed shaft diameter combinations within a range limited by the flexible coupling shaft bores. Radial compressibility of the sleeve insert is facilitated by the utilization of resilient material, interruption of the circumferential extension by a longitudinal slot, or both. Utilization of congruent longitudinally uniform, radially non-uniform, flexible coupling shaft bore and insert sleeve outward surfaces provides additional torque transmission capacity.

2 Claims, 4 Drawing Sheets

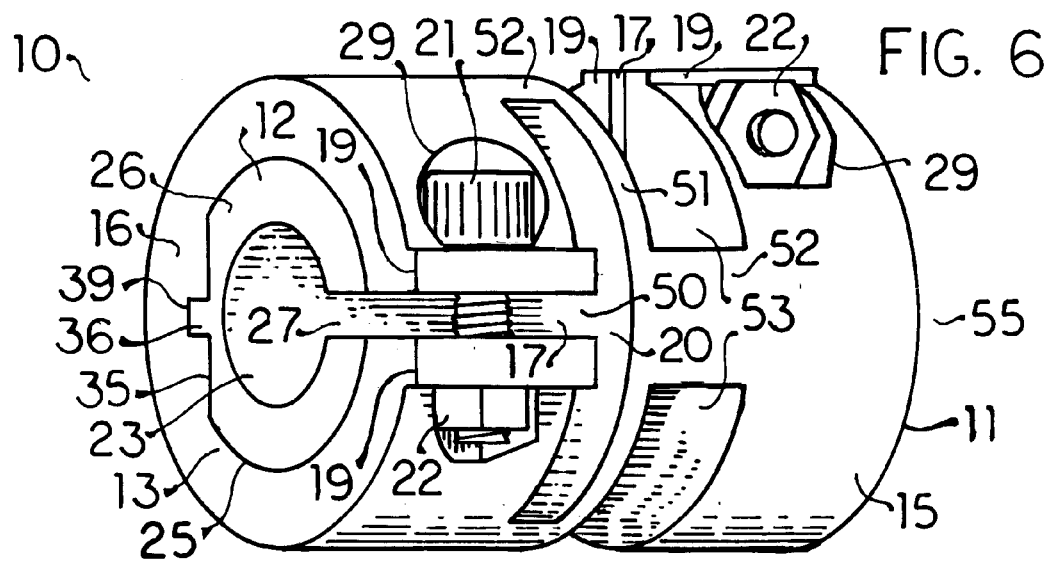
FIG. 6
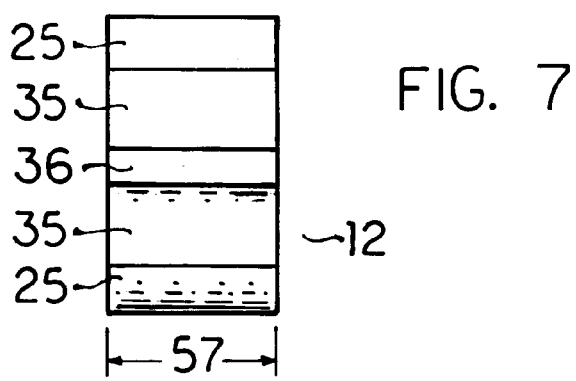
FIG. 7
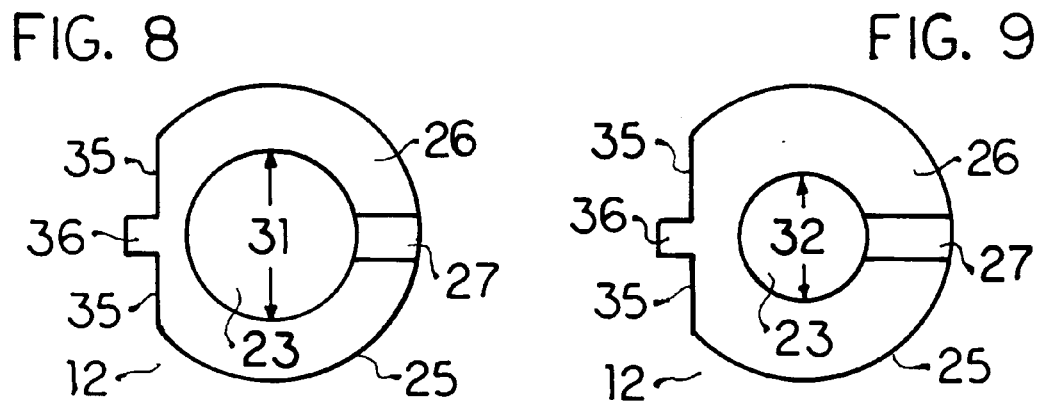
FIG. 8
FIG. 9

MULTIPLE SHAFT DIAMETER FLEXIBLE COUPLING SYSTEM

BACKGROUND OF THE INVENTION

1. Field of the Invention

The field of the present invention relates:

generally to flexible couplings for rotary shafts transmitting torque via a flexible element;

more particularly to flexible couplings for rotary shafts transmitting torque via a flexible element facilitating angular misalignment; and most specifically to the use of sleeve inserts in flexible coupling of rotary shafts with torque transmission via a flexible element that facilitates angular misalignment.

2. General Background

It is considered that the basic, fundamental, purpose of a flexible shaft coupling is the transmission of torque between drive and driven shafts possessing a small degree of angular misalignment between substantially aligned rotational axes. In this context it is next considered that flexible shaft couplings are used in a huge range of applications which can perhaps best be demarcated by one simple opposition between larger, dedicated, applications and smaller, variable, applications. The coupling of a drive shaft to a knuckle joint on a driven wheel of an automobile is considered exemplary of the first category. Other examples of similarly large, dedicated, applications include coupling of an airplane propellor or helicopter rotor to a power drive shaft. Opposed to this are flexible shaft couplings which are generally available with different bore sizes for coupling rotary shafts in precision power transmission, positioning control, and smaller power transmission devices including but not limited to: encoders, resolvers, DC tachometer generators, precision potentiometers, stepper & servo motors, XYZ tables, robotics, optics, laboratory, medical and business machines.

It is noted that in the second category flexible shaft couplings are typically used as 'off the shelf' components in the building of machines or for coupling the driven shaft of a device to the shaft of an electric motor for a temporary, unique, or otherwise various purpose. In either case the couplings are purchased in accordance with the diameter of the shafts concerned. The shafts, however, are not always of the same diameter. And if a flexible shaft coupling having the two different diameter shaft bores desired is available the expense may be considerable for what essentially must be a 'special' run for the flexible coupling manufacturer. Otherwise a flexible coupling having one bore which fits the smaller shaft is commonly used and the other bore is machined out to the larger diameter required.

It is further considered that 'miniature' shaft couplings intended for use in precision power transmission, positioning control, and smaller power transmission devices including but not limited to: encoders, resolvers, DC tachometer generators, precision potentiometers, stepper & servo motors, XYZ tables, robotics, optics, laboratory, medical and business machines are more economically molded in plastic than machined in metal, and in this case a 'special run' of flexible couplings having shaft bores which are not 'stock' is impractical as this requires a whole new set-up with a new mold, and a separate production run, as opposed to simply altering the bore concerned at the end of a routine, standard stock size, production run for just the number of units ordered in which case only the time necessary to make the single tool adjustment is incurred as an additional expense.

Another basic distinction, based upon the economics of manufacture concerned, is hence recognized between molded plastic flexible couplings and machined metal rotary shaft couplings. Molding is more economic in volume production and machining is more economically accommodative of variations, particularly with respect to bore diameter, as his is determined simply by the position of a tool during the routine manufacturing process while molding a different bore requires a whole new set-up with a new mold.

Discussion of the Prior Art

U.S. Pat. No. 949,189 issued to Hugo Lentz discloses a 'universal coupling' using a rectangular cross section 'bush' or sleeve which fits into the rectangular bore of the hub of a 'rotary cylinder' and into which a shaft having at least two exterior parallel opposed surfaces contacting interior opposed parallel surfaces of the 'bush'.

The other two opposed parallel surfaces can also make contact, as shown in FIG. 7, but it is preferred that these surfaces have a 'swell' or outward smooth curved enlargement which contacts the bush interior walls and holds the shaft by tightening two set screws behind the 'swells'.

French Patent 1306123 issued to M. Antelme discloses a coupling with a solid elastic body with two opposed blind hexagonal cavities into which a hex nut with a smooth bore is located with a radial pin through apertures in the coupling body and the nut.

A long bolt is apparently threaded through a tapped aperture through the middle of the pin for fixing the depth of the pin which, although shown to be smooth, clearly engages a tapped aperture in the nut and has a slot 10 on the end which would allow rotation with a flat blade screwdriver. The pin evidently passes through a transverse aperture through a shaft located in the bore of the nut or hexagonal insert and the long bolt could attach the shaft to the pin.

U.S. Pat. No. 3,395,552 issued to Hauser, Jr. discloses a flexible coupling having a stiff sleeve 8 fitted into an interiorly 'serrated' or splined bore of a flexible sleeve which is longer and is connected at either end to a shaft hub, 2, 4, by a pin 11 through opposed apertures 12, 13 through the hub and ends of the flexible sleeve which reduces shock transmission and accommodates slight shaft misalignment while the stiff sleeve insert provides dampening at resonant frequencies.

Great Britain Patent 1 283 723 issued to Mayerjak discloses, as clearly seen in FIG. 5, a flexible coupling using a rubber sleeve between the exterior surface of a small diameter tubular member and the interior surface of a larger diameter tubular member which are mechanically connected by sets of arms: "Finally, in the embodiment described . . . the use of an elastomeric bushing 62 between the drive and driven shafts has the result of increasing the natural frequency of the overall coupling, and . . . provide a fail safe restraint in the event of failure of one or more of the flexing elements." (Page 3, lines 35–49)

Soviet Union Patent 1106558 issued to the KRAMA Mechanical Engineering Research Institute discloses a 'universal hinge' or coupling for two rotary shafts, one having a split blade held by a 'frictional insert' in a bore of the other shaft which is held in an outer sleeve with a frictional insert. The outer sleeve contacts the exterior of the first shaft directly. The frictional inserts have curved exterior surfaces which apparently provide for two axes of rotation in accommodation of angular shaft misalignment.

U.S. Pat. No. 4,560,364 issued to Cohen discloses a 'fail-safe improvement for a flexible coupling' using a 'plug' which is threaded into one shaft and has a flange for retaining a tubular section of the second shaft in connection with the first if the primary, outward double wall flange, coupling fails. The plug is provided with a 'head' shown as a hex which facilitates tightening.

Statement of Need

Because smaller flexible shaft couplings typically used as 'off the shelf' components are often desired for applications in which two different diameter shafts must be coupled and because flexible shaft couplings having different shaft bores are often not readily available, particularly in molded plastic 'miniature' flexible shaft coupling suited for economic precision power transmission, positioning control, and smaller power transmission, it is considered desirable to be able to economically reduce the bore of a flexible shaft coupling, particularly the bore of a molded plastic 'miniature' flexible shaft coupling suited for economic precision power transmission, positioning control, and smaller power transmission which, because it is molded, cannot have a bore diameter economically altered during the routine manufacturing process. And while a variety of hollow, sleeve type, inserts into which shafts are fitted are known which fit the bore of a flexible coupling none have the purpose or capability of accommodating various shaft diameters as none effect a reduction of a flexible shaft coupling bore diameter which could be used without the insert with a larger diameter shaft.

A need is hence discerned for an economic means of reducing a shaft bore of a flexible shaft coupling, particularly the bore of a molded plastic 'miniature' flexible shaft coupling suited for economic precision power transmission, positioning control, and smaller power transmission in various applications in which flexible shaft couplings are used as 'off the shelf' components and the manufacturing process prohibits economic variation of bore diameter during routine production.

SUMMARY OF THE INVENTION

Objects of the Invention

The primary, encompassing object of principles relating to the present invention, is the provision of a system for the accommodation of multiple shaft diameters by a single flexible rotary shaft coupling.

A first auxiliary object of the principles relating to the present invention is the provision of a system for flexible coupling of a driven shaft having a different diameter than the drive shaft using purchased components without enlargement of a coupling bore by subsequent machining.

An ancillary object of the principles relating to the present invention is the provision of an economic system for flexible coupling of a driven shaft having a different diameter than the drive shaft in precision power transmission, positioning control, and smaller power transmission devices.

Another ancillary objective of the principles relating to the present invention is the provision of an economic system for flexible coupling of a driven shaft having a different diameter than the drive shaft in precision power transmission, positioning control, and smaller power transmission devices which utilizes molded plastic components.

A second auxiliary object of the principles relating to the present invention is the provision of an economic system for flexible coupling of a driven or drive shaft having various diameters.

Other ancillary objectives of the principles relating to the present invention include the provision of an economic system for flexible coupling of a driven or drive shaft having various diameters which is simple and easy to use and provides adequate torque transmission characteristics.

Principles Relating to the Present Invention

In achievement of the above stated objectives it is suggested that a sleeve insert be utilized in reduction of an effective bore of a flexible shaft coupling and that the sleeve insert and be molded in plastic. It is suggested that a clamp collar effecting compression through the sleeve insert in engagement with a shaft be utilized and hence that the sleeve insert be radially compressible. It is considered that thermoplastic generally possesses excellent resilience, compressibility, and surface adhesion in comparison with metal and that a molded plastic insert is hence inherently both compressible and better suited to the transfer of torque through surface contact.

In facilitation of diameter reduction of the sleeve insert during radial compression it is suggested that a longitudinal interruption of the circumferential extension of the sleeve insert be effected with a longitudinal slot through the wall of the same. And it is suggested that congruent longitudinally uniform but radially non-uniform configurations be used for the sleeve insert and the bore of the flexible coupling to provide additional torque capacity.

One or more radially flattened longitudinal sides to both the exterior surface of the sleeve insert and the bore of the flexible coupling is suggested as one class of longitudinally uniform, radially non-uniform, configurations considered suitable. Splined surfaces are also suggested as suitable configurations as is the use of one or more matching keys and key ways.

It is further suggested that the interior surface of the sleeve insert be substantially cylindrical, in order to conform to the greatest majority of rotary shafts commonly utilized in precision power transmission, positioning control, and smaller power transmission devices, except for any longitudinal interruption by use of a slot through the wall of the sleeve insert.

The flexible coupling possesses at least one longitudinal slot through the wall of the same which is partially closed in the application of compression upon the shaft through the radially compressible sleeve insert by the exertion of transverse compression across the slot effected by the tightening of a threaded fastener which bridges the slot. As compression upon each shaft is required use of a single longitudinal slot entails that both threaded fasteners bridge the same, full length, longitudinal slot. If this slot is extended across both wall, effectively dividing the body of the flexible coupling into two bilateral portion, two additional threaded fasteners are required in a simple clamp arrangement which is opposed to a clamp collar wherein the coupling body is one piece.

If two longitudinal slots are utilized the threaded fasteners can be disposed in other dispositions. The threaded fasteners, and much shorter than full length longitudinal slots, can be radially opposed rather than aligned or offset from each other by ninety degrees. The use of shorter than full length longitudinal slots, moreover, facilitates the use of more complex configurations including use of one or more axially suspended discs as described in U.S. patent application Ser. No. 10/152,291 entitled 'Integral Thermoplastic Body Flexible Shaft Coupling'. This specifically suggested configuration accommodates a full degree of angular misalignment between shafts per disc axially suspended by two radially perpendicular pairs of opposed longitudinal arm extending across an axially open core and provides good torque transmission characteristics.

It is hence also recommended that the body of the flexible shaft coupling be molded plastic although this is not necessary and that stainless steel nuts and bolts be used for the threaded fasteners, particularly for miniature flexible coupling systems intended for precision power transmission, positioning control, and smaller power transmission devices. Other specific suggestions in embodiment of the principles relating to the present invention may be appreciated with a reading of the detailed description following, especially if conducted with reference to the drawings attached hereto, and briefly described immediately below, utilizing the reference numerals common to both in identification of elements further catalogued in the nomenclature following this.

BRIEF DESCRIPTION OF THE DRAWINGS

FIG. 6 is an isometric view of a one piece flexible body coupling with a radial disc axially suspended by two radially perpendicular pairs of opposed longitudinal arms and a split sleeve insert with one longitudinal flat along the outer surface with one medially located key projecting outward therefrom in accordance with the principles relating to the present invention.

FIG. 7 is a side view of the split sleeve insert with one longitudinal flat along the outer surface with one medially located key projecting outward therefrom depicted in FIG. 6.

FIG. 8 is an end view of the split sleeve insert with one longitudinal flat along the outer surface with one medially located key projecting outward therefrom depicted in FIG. 6.

FIG. 9 is aN end view of a split sleeve insert with one longitudinal flat along the outer surface with one medially located key projecting outward therefrom having the same outer diameter as the split sleeve insert depicted in FIGS. 6 & 7 but possessing a smaller inner diameter.

| NOMENCLATURE | |
|---|---|
| 10 | coupling system |
| 11 | coupling |
| 12 | sleeve insert |
| 13 | bore (of coupling) |
| 15 | exterior surface |
| 16 | wall (of coupling) |
| 17 | longitudinal slot |
| 19 | bosses |
| 20 | threaded fastener |
| 21 | bolt |
| 22 | nut |
| 23 | insert bore |
| 25 | insert outer surface |
| 26 | insert wall |
| 27 | circumferential gap |
| 29 | recesses |
| 30 | full bore diameter |
| 31 | first reduced diameter |
| 32 | second reduced diameter |
| 33 | spline |
| 35 | flat |
| 36 | key |
| 37 | transverse slot |
| 39 | key way |
| 50 | axially suspended disc |
| 51 | radial arm |
| 52 | longitudinal arm |
| 53 | open core |
| 55 | end (of coupling) |
| 56 | |
| 57 | length (of sleeve insert) |
| 59 | |

DETAILED DESCRIPTION OF PREFERRED EMBODIMENT

Figure 1:
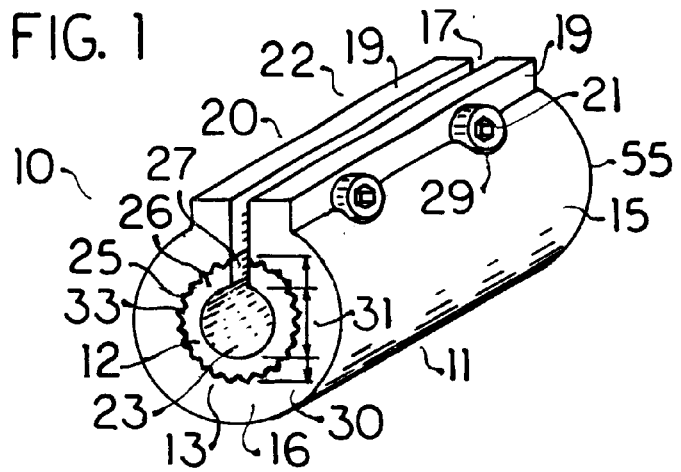
FIG. 1 is an isometric view of a simple solid body coupling with one longitudinal slot and a splined sleeve insert in accordance with the principles relating to the present invention.

A multiple diameter coupling system 10 in accordance with the principles relating to the present invention, as depicted in FIG. 1, includes a rotary shaft coupling 11 with two opposed bores 13 each open to one end 55 of the coupling 11 and a radially compressible sleeve insert 12 disposed in at least one said bore 13 effectively reducing the diameter of the same. The coupling 11 depicted in FIG. 1 possesses a simple straight substantially cylindrical configuration of substantially uniform, solid, wall 16 thickness except for one longitudinal slot 17 interrupting the circumferential extension of the wall 16 and the opposed pair of longitudinal bosses 19 extending radially outward from the otherwise cylindrical wall 16 along either side of this single longitudinal slot 17 which facilitate partial closing of the same with the use of two threaded fasteners 20 each located in association with, i.e. operably upon, one bore 13 and preferably comprised, as shown therein, of one bolt 21 traversing the longitudinal slot 17 and mating one nut 22 on the opposed side.

It is further preferred that the coupling 11 be molded in plastic in which case flexible coupling of two rotary shafts, not shown, is obtained with each shaft engaged by one of the two bores 13 either which can have its full bore diameter 30 effectively reduced to any first reduced bore diameter 31, in accordance with the principles relating to the present invention, by use of a sleeve insert 13 disposed therein as shown in FIGS. 1–4 and the full bore diameter 30 of the other bore 13 reduced to any second reduced bore diameter 32 as shown in FIGS. 8 & 9. The substantially cylindrical insert bore 23 contacts the inserted rotary shaft under compression exerted by tightening the associated threaded fastening 20. This action radially compresses the sleeve insert 13 which compression is preferably facilitated by a circumferential gap 27 in the insert wall 26 which is further preferably molded in plastic.

The insert outer surface 25 must conform in shape to the bore 13 concerned and, in the case depicted in FIG. 1 both possess a set of congruent, mating, splines 33 as seen therein. The only interruption to the cylindrical wall 16 about the bore 13 is the longitudinal slot 17 and the only interruption to the insert outer surface 25 and the insert wall 26 is the circumferential gap 27. The circumferential gap 27 is partially closed by partial closing of the longitudinal slot 17 with tightening of the relevant fastener 20 regardless of the radial disposition of the former with respect to the latter. However, this requires some creep between the insert outer surface 25 and the bore 13 surface contacted which can readily be avoided with alignment of the circumferential gap 27 with the longitudinal slot 17.

Figure 2:
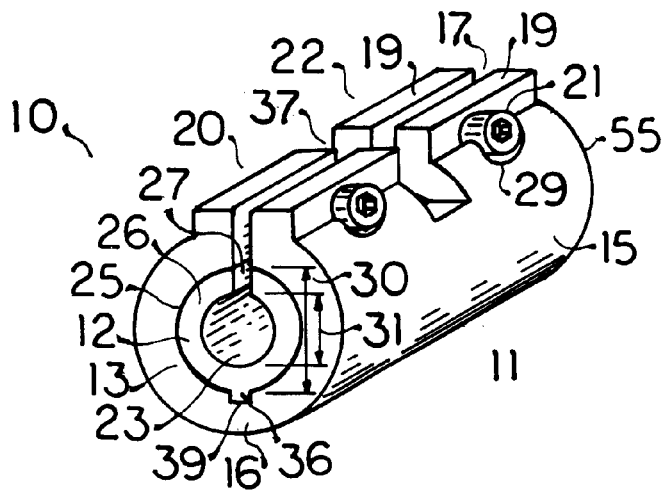
FIG. 2 is an isometric view of a solid body coupling with one longitudinal slot, one transverse slot, and a split sleeve insert with a longitudinal key along the outer surface in accordance with the principles relating to the present invention.

This alignment and resistance to rotation of the sleeve insert 12 within the bore 13 can both be ensured by a longitudinal uniform and radially non-uniform configuration of the insert outer surface 25 and congruent bore 13 surface as shown in FIGS. 1–6. A single key 36 projecting radially from the insert outer surface 25, preferably located diametrically opposite the circumferential gap 27 as shown in FIG. 2, which fits into a congruent key way 39 in the bore 13 is one example of a longitudinal uniform and radially non-uniform configuration which clearly ensures the desired radial alignment and avoids creep during circumferential compression.

Figure 3:
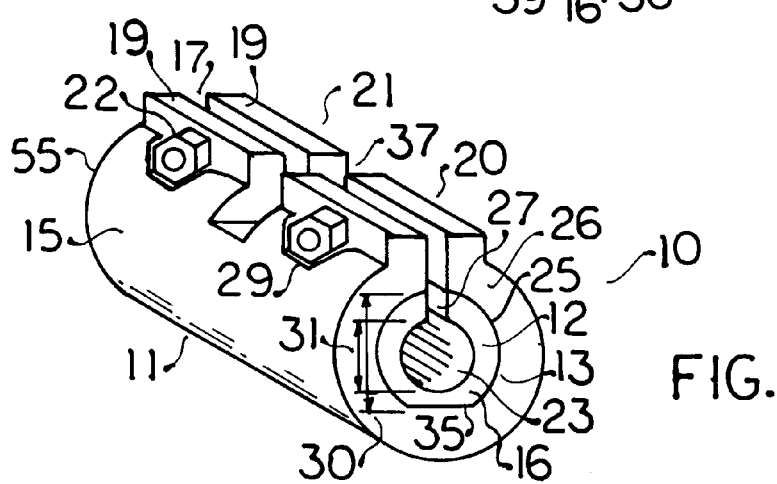
FIG. 3 is an isometric view of a solid body coupling with one longitudinal slot, one transverse slot, and a split sleeve insert with a longitudinal flat along the outer surface in accordance with the principles relating to the present invention.

It is also noted that the coupling 11 depicted in FIG. 2 possesses, in addition to a longitudinal slot 17, a transverse slot 37 medially bisecting the longitudinal bosses 19 and extending through a portion of the wall 16 of the coupling 11. This transverse slot 37 provides additional flexibility with respect to angular misalignment between coupled rotary shafts. FIG. 3 depicts a coupling system 10 in accordance with the principles relating to the present invention using similar to that depicted in FIG. 2 except for the use of a longitudinal flat 35 into the insert outer surface 25 and outward from the bore 13 of the coupling 11.

The flat 35 into the outer surface 25 as depicted in FIG. 3 is radially or diametrically opposed to the circumferential gap 27 and the flat 35 outward from the bore 13 is also radially opposed to the longitudinal slot 17. This arrangement aligns the circumferential gap 27 through the insert wall 26 with the longitudinal slot 17 through the wall 16 of the coupling 11 which alignment avoids creep of the insert outer surface 25 against the bore 13 surface during compression effected by tightening the relevant threaded fastening 20.

Figure 4:
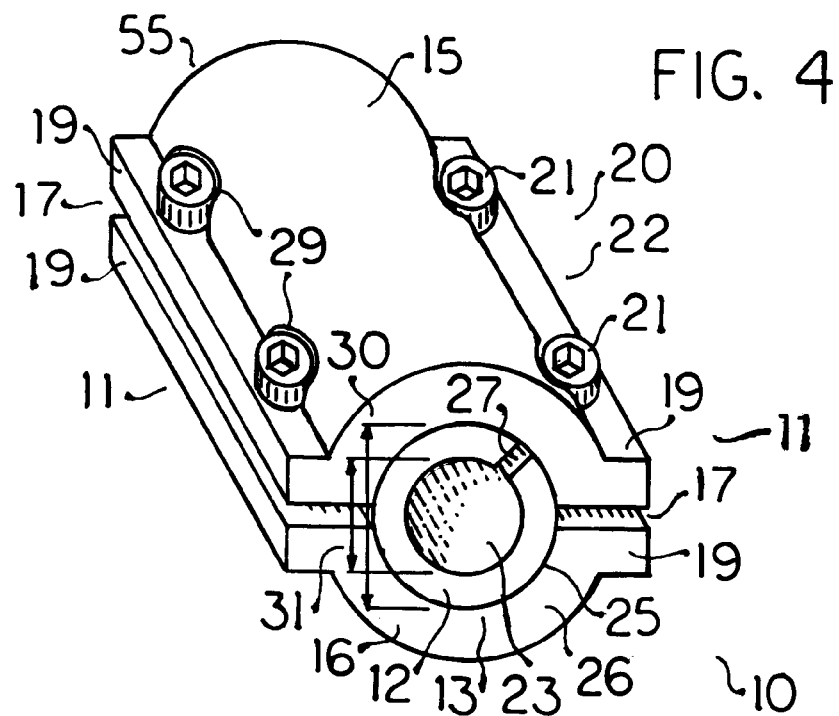
FIG. 4 is an isometric view of a simple split body coupling with one longitudinal slot and a split sleeve insert with a smooth substantially cylindrical outer surface in accordance with the principles relating to the present invention.

The coupling 11 depicted in FIG. 4 is split into two halves by a full diameter division, resulting in two aligned longitudinal slots 17, extended through opposed wall 16 portions of a substantially cylindrical configuration except for two opposed pairs of longitudinal bosses 19 and recesses 29 for the two threaded fasteners 20 which, in this case, hold the split coupling 11 together in addition to providing compression for engagement of a rotary shaft.

It is noted that the opposed pairs of bosses 19 depicted in the drawings attached hereto, together with a pair of opposed recesses 29 of appropriate shape, simply provide a pair of flat, normal, surfaces for contact by the inner surfaces of the nut 22 and the head of the bolt 21 preferably comprising a threaded fastener 20. The combination of bosses 19 and recesses 29 is intended, in a conventional manner, to simply minimize the modification of the otherwise cylindrical shape of the body of the coupling 11, thereby preserving inertial balance about the axis of rotation, and either can be eliminated if desired leaving the other to provide a sufficiently large flat surface for the head of the bolt 21 and the nut 22.

It is further noted that the circumferential gap 27 in the insert wall 26 seen in FIG. 4 is not aligned with one of the two longitudinal slots 17. This is in recognition of the necessity of some creep between the insert outer surface 25 and the bore 13 surface in a substantial closure of the single circumferential gap 27 through the insert wall 26 due to the fact that two longitudinal slots 17 are being partially closed in compression rather than one. For this reason both the coupling 11 and sleeve insert 12 depicted in FIG. 4 possess a smooth, substantially cylindrical, bore 13 surface and insert outer surface 25 without additional resistance to rotation provided by a radially non-uniform configuration. The alignment of the circumferential gap 27 and one of the two longitudinal slots 17 is hence preferably uncontrolled in this case and is essentially irrelevant.

Figure 5:
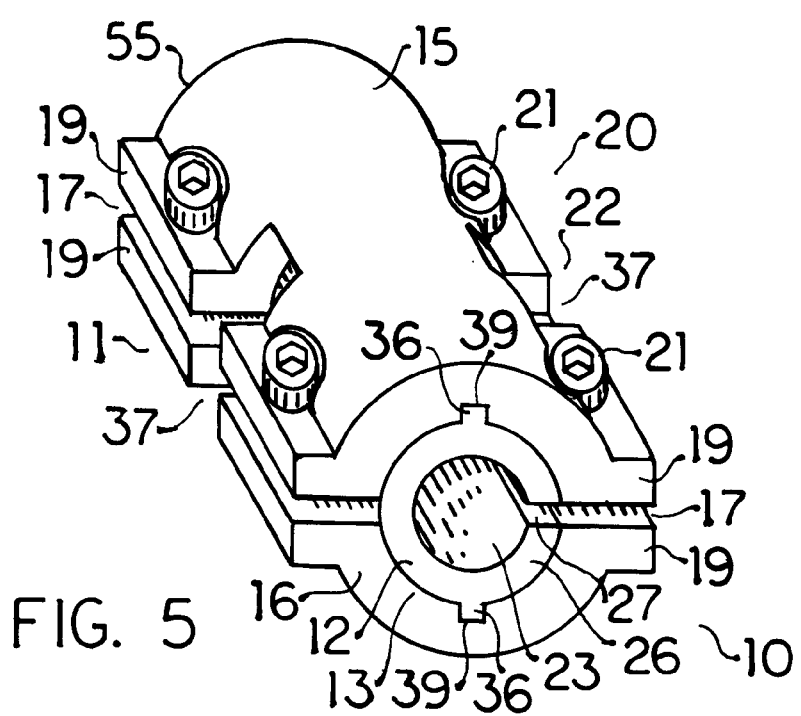
FIG. 5 is an isometric view of a solid body coupling with one longitudinal slot, one traverse slot, and a split sleeve insert with opposed keys projecting from the outer surface in accordance with the principles relating to the present invention.

The coupling 11 depicted in FIG. 5 is similar to that depicted in FIG. 4 in being split into two halves, and is similar to the substantially solid coupling 11 depicted in FIGS. 2 & 3 in possessing a transverse slot 37 for the same reason. However, it will be noticed that each half of the split coupling 11 depicted in FIG. 5 possesses a key way 39 extending radially outward from the otherwise substantially semi-cylindrical bore 13 surface of each half into which one of two opposed keys 36 extending radially outward from the insert wall 26 fits. This non-radial feature prohibits the creep between the insert outer surface 25 and the bore 13 surface mentioned above as being necessary for substantial closure of the circumferential gap 27 in the insert wall 26.

The sleeve insert 12 utilized in the coupling system depicted in FIG. 5 is still radially compressed by tightening of the two threaded fasteners 20 as creep between the insert outer surface 25 and the bore 13 surface is unnecessary if the sleeve insert 12 is molded to be slightly sprung open beyond cylindrical, with a larger circumferential gap 27 and slightly larger insert bore 23 with respect to the nominal shaft diameter addressed. Because the coupling 11 is split there is no interference in placing an oversized sleeve insert 12 inside either bore 13 with the opposed keys 36 fit into the key ways 39 when the split coupling 11 is sufficiently opened. If correctly sized to obtain an insert bore 23 diameter equal to nominal shaft diameter under a state of compression against the shaft the circumferential gap 27 in the insert wall 26 is partially closed, compared to the sprung condition, but the insert outer surface 25 is cylindrical and a substantial circumferential gap 27 remains in the compressed condition engaging a rotary shaft of the diameter addressed. Creep between the insert outer surface 25 and the bore 13 surface is avoided in this manner and the two opposed keys 36 facilitate correct assembly of the split coupling 11.

It is emphasized that the sleeve insert 12 is slightly sprung beyond cylindrical in a free, uncompressed, state and that the split coupling 11 accommodates this. The sleeve insert 12 in this case is molded in the sprung shape, with a larger circumferential gap 27 than it possesses in the compressed state. This approach can also be used with coupling systems in accordance with the present invention using a coupling 11 with only one longitudinal slot associated with each bore 13 but the coupling 11 must also be slightly sprung with respect to perfectly cylindrical form in a relaxed state. This complicates manufacture and for this reason alone it is suggested that a sprung sleeve insert 12 be used with a split coupling 11 which made from two substantially semi-cylindrical forms and that solid couplings 11 use substantially cylindrical forms.

The coupling system shown in FIG. 6 depicts a sleeve insert 12 with a combined flat 35 inward and key 36 outward with respect to the bore 13 which arrangement maximizes resistance to rotation when fitted against the congruent flat 35 and key way 39 without diminishing the substantially uniform thickness of the wall 16 of the coupling 11. This configuration is particularly recommended for substantially solid couplings 11 of the type depicted in FIGS. 1–3 rather than a split type coupling 11 as depicted in FIGS. 4 & 5 for reasons discussed above with respect to the difference between a substantially solid and a split coupling 11 pertaining to creep and the benefit of aligning the circumferential gap 27 in the insert wall 26 with a single longitudinal slot 17 and if molded with an insert bore 23 slightly sprung with respect to nominal shaft diameter split this preference is moot.

The coupling 11 depicted in FIG. 6 possesses only one longitudinal slot 17 associated with each bore 13 but, in contrast to the couplings 11 depicted in FIGS. 1–3, the two longitudinal slots 17 of the coupling 11 depicted in FIG. 6 are not radially aligned but instead possess a perpendicular disposition or ninety degree offset between the two and the two associated pairs of opposed bosses 19 and recesses 29 and hence the threaded fasteners 20 operating in partial closure of the same. This perpendicular relation is preferred to the aligned disposition depicted in FIGS. 2 & 3 for superior inertial balance but it is also another complication to manufacture.

More importantly, the coupling 11 depicted in FIG. 6 is seen therein to possess a much different, more open and flexible, configuration than the other couplings 11 depicted in the drawings attached hereto. In fact, it is believed that the configuration shown in FIG. 6 represents the most sophisticated, most flexible, high speed single piece molded plastic coupling 11 known and U.S. patent application Ser. No. 10/152,291 filed May 22, 2002 entitled 'Integral Thermoplastic Body Flexible Shaft Coupling' separately claims this innovation by the present inventor. It is hence expected that a detailed discussion of this innovation, particularly with regard to its method of manufacture, will be available as a U.S. Patent and preferred that this discussion, particularly with regard to its method of manufacture, retain its proprietary nature and remain undisclosed except by U.S. Patent.

In brief the coupling 11 body depicted in FIG. 6, including the bore 13 which is adapted to mate with the sleeve insert 12 as discussed above, is molded in one piece of thermoplastic and possesses one axially suspended disc 50 essentially comprising the intersection of two perpendicular radial arms 51 which are spaced apart from the two opposed ends of the coupling 11 by two radially perpendicular pairs of longitudinal arms 52. This configuration facilitates axial flexure under conditions of angular misalignment of up to a full degree between the rotary shafts so coupled. A variation of this configuration employs two sets of axially suspended discs 50 and associated perpendicular pairs of arms 51, 52 and accommodates two degrees of angular misalignment.

FIGS. 7–9 depict the sleeve insert 12 used in the coupling system in accordance with the principles relating to the present invention depicted in FIG. 6 and represent any sleeve insert 12 used in said system in having a length 57 commensurate with the length of a rotary shaft desired for engagement thereby. In this connection it is noted that the strength of such an engagement is maximized at 3/2 the shaft diameter. If the shaft is 6 mm (0.236") the optimum length 57 of the sleeve insert 12 is 9 mm (0.354"). The diameter of the insert bore 23 in the compressed state is equal to the diameter of the shaft and with a first reduced diameter 31 provided by one sleeve insert 12 such as that depicted in FIG. 8 of 6 mm, for example, provides a reduced bore for a full bore diameter 30 of 10 mm (0.394") leaving a basic insert wall 26 thickness, under compression, of 2 mm (0.078").

FIG. 9 depicts a second sleeve insert 12 having a second reduced diameter 32 of, for example, 5 mm (0.197"), and a third sleeve insert 12, not shown, might have a third reduced diameter of 4 mm (0.157"). All of these sleeve inserts 12 have the same diameter insert outer surface 25 and hence fit into the same full bore diameter 30 of the same coupling 11 and the coupling system, in this case, provides for use with 10 mm, 6 mm, 5 mm, and 4 mm diameter rotary shafts. Use of the particular configuration of sleeve insert 12 depicted in FIGS. 6–9 using a combined flat 35 and key 36, and the configuration depicted in FIG. 3 using a single flat 35 alone, raises a concern regarding the use of a cylindrical shaft without the sleeve insert 12. While a rotary shaft with a flat 35 and the appropriate diameter obviously will fit the full bore diameter 30 perfectly a cylindrical rotary shaft of the same diameter would appear to have interference from the flat 35 into the full bore diameter 30.

It is assumed, however, that the rotary shaft is steel and that the coupling 11 is molded in plastic. In this case the presence of a relatively shallow flat 35 as depicted in FIGS. 3, 6, 8 & 9 is practically insignificant as the coupling 11 and a properly sized sleeve insert 12 both in a relaxed state with the threaded fasteners 20 loose is large enough to readily admit the insertion of a steel, i.e. rigid, rotary shaft of a diameter equal to the nominal full bore diameter 30 slightly reduced by the flat 35 into the same.

Using the 10 mm nominal full bore diameter 30 of the current example the reduction in the bore 13 effected by the flat 35 is less than 10%, i.e. less than 1 mm (0.039"), which amount is readily taken up by distortion of the wall 16 of a plastic coupling 11 adjacent the flat 35 in conformance with the steel shaft under compression resulting from tightening of the relevant threaded fastener 20. This is not considered an ideal situation but for the purposes addressed, for example coupling a 10 mm shaft of a motor to a 5 mm shaft of an encoder, the loss in maximum torque capacity and speed resulting is simply meaningless because of the modest operational parameters anticipated.

Figure 10:
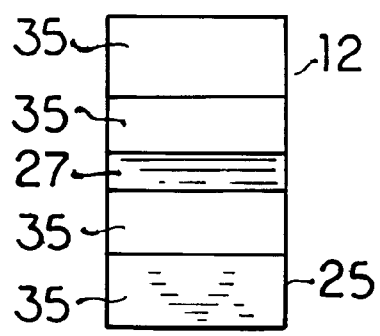
FIG. 10 is a side view of a split sleeve insert with six longitudinal flats along the outer surface intended for reduction of the effective bore in coupling of two rotary shafts in accordance with the principles relating to the present invention.
Figure 11:
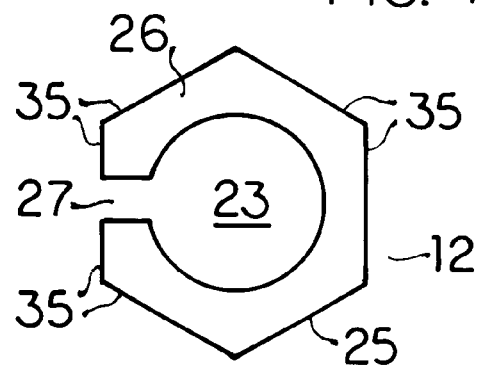
FIG. 11 is an end view of a split sleeve insert with six longitudinal flats along the outer surface intended for reduction of the effective bore in coupling of two rotary shafts in accordance with the principles relating to the present invention.
Figure 12:
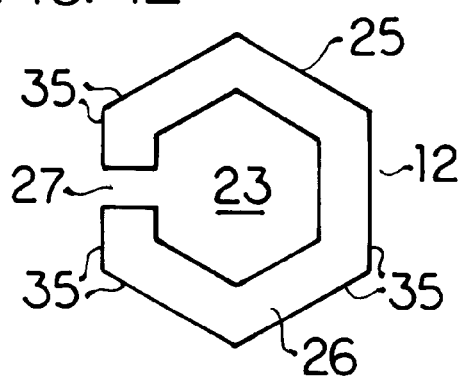
FIG. 12 is an end view of a split sleeve insert with six longitudinal flats along the outer surface similar to FIG. 11 but having a hexagonal rather than a cylindrical insert bore intended for reduction of the effective bore in coupling of two rotary shafts in accordance with the principles relating to the present invention.

The sleeve inserts 12 depicted in FIGS. 10–12 illustrates another aspect of the use of flats 35 to resist rotation of the sleeve insert 12 within the bore 13 of the coupling 11 wherein the bore 13 surface and the insert outer surface 25 both effectively possess six flats 35 symmetrically normal the axis of rotation, i.e. a hexagonal shape. A substantially cylindrical insert bore 23 is still generally preferred as depicted in FIG. 11 but it is also considered that a hexagonal shape as depicted in FIG. 12 is functional. Rotary shafts are not commonly equipped with a hexagonal cross section but a cylindrical shaft of appropriate diameter is still readily inserted and engaged under compression resulting from tightening of the relevant threaded fastener 20 of a plastic coupling 11 without a sleeve insert 12 for much the same reason given above regarding a single flat 35 to a bore 13 of a plastic coupling 11: the flat(s) will distort under compression into conformance with the rigid rotary shaft. Perfect conformance unnecessary if the operational parameters are modest. In the case of a hexagonal bore 13 or insert bore 23, moreover, the rotary shaft so engaged is centered within the coupling 11 which has a longitudinal axis which will thus be coincident with the axis of rotation for the rotary shaft, as is desired. The use of single flat 35 will throw the coupling 11 axis off of the rotational axis a small amount but the amount is very small and is for most practical purposes insignificant. In the 10 mm example used herein the axis offset does not exceed 0.25 mm (0.010").

Figure 15:
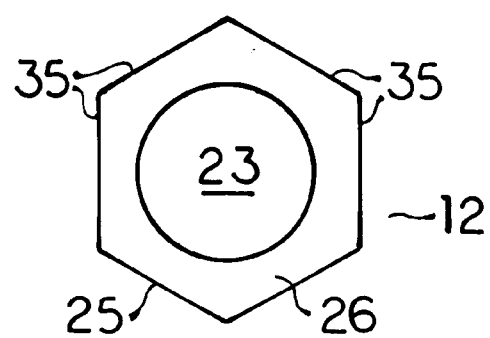
FIG. 15 is an end view of a solid sleeve insert with six longitudinal flats along the outer surface and a cylindrical bore intended for reduction of the effective bore in coupling of two rotary shafts in accordance with the principles relating to the present invention.
Figure 14:
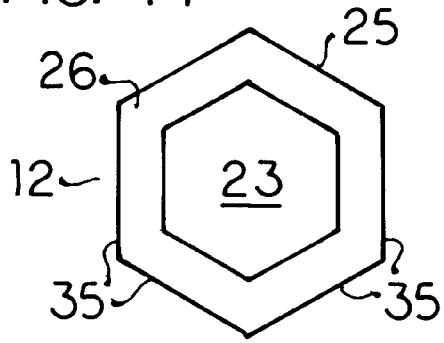
FIG. 14 is an end view of a solid sleeve insert with six longitudinal flats along the outer surface and a hexagonal bore intended for reduction of the effective bore in coupling of two rotary shafts in accordance with the principles relating to the present invention.
Figure 13:
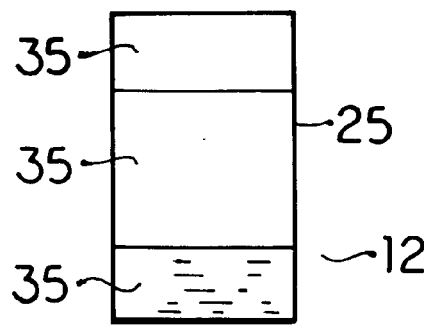
FIG. 13 is a side view of a solid sleeve insert with six longitudinal flats along the outer surface intended for reduction of the effective bore in coupling of two rotary shafts in accordance with the principles relating to the present invention.

The sleeve inserts 12 depicted in FIGS. 13–15 are also hexagonal with six equidistantly normal flats 35 with respect to a central axis. In contrast to the sleeve insert 12 depicted in FIGS. 10 & 11, however, there is no circumferential gap 27 through the insert wall 26 which is circumferentially solid. The radial compression required of this particular sleeve insert 12 is provided solely by the compressibility or resilience of the material utilized in the manufacture of the same. For this reason the solid hexagonal sleeve insert 12 depicted in FIG. 13 also has a hexagonal insert bore 23 which, for the reasons given above regarding deformation of a hexagonal bore 13 of a plastic coupling 11, is not considered ideal but is considered fully satisfactory with regard to torque transmission capabilities. The sleeve insert 12 depicted in FIG. 14, however, is considered less than fully satisfactory owing to the inability of a solid cylindrical insert bore 23 to undergo compression in conformance with a cylindrical rotary shaft.

The foregoing is to provide one practiced in the art with the best known manner of making and using an embodiment of the principles relating to the present invention and is not to be construed in any manner as restrictive of said invention or the rights and privileges obtained by letters patent in protection of the same and for which I claim:

1. A system intended to provide flexible coupling of multiple diameter rotary shafts comprising:
   the provision of a coupling possessing a substantially cylindrical exterior surface and two straight, longitudinally uniform, bores each open to an opposed end and each bounded by a wall possessing a substantially uniform thickness further possessing a longitudinal slot therethrough interrupting the circumferential extent of said wall and traversed by a threaded fastener associated with said bore;
   the provision of at least one radially compressible sleeve insert possessing a straight, longitudinally uniform, insert outer surface and a substantially cylindrical bore bounded by an insert wall possessing a substantially uniform wall thickness interrupted in circumferential extent by a circumferential gap;
   said insert outer surface being congruent to and fitting within either said bore of said coupling having said associated threaded fastener in a loose condition;
   wherein said coupling is split into two halves held together by two pairs of threaded fasteners traversing two diametrically opposed continuous longitudinal slots each including a portion associated with both said bores, said system further including two radially opposed keys extending radially from said insert outer surface mating two radially opposed key ways extending into one said bore;
   whereby fitting said sleeve insert into one said bore of said coupling presents a reduced diameter bore comprised by said insert bore into which a rotary shaft of a reduced diameter with respect to the diameter of said bore of said coupling is readily fitted;
   whereby tightening of said threaded fastener associated with one said bore of said coupling provides radial compression providing engagement of a rotary shaft inserted into said bore possessing a full diameter with respect to the diameter of said bore; and
   whereby tightening of said threaded fastener associated with one said bore of said coupling having said sleeve insert fitted therein provides radial compression of said sleeve insert and provides engagement of a rotary shaft possessing a reduced diameter with respect to said full diameter.

2. A system intended to provide flexible coupling of multiple diameter rotary shafts comprising:
   the provision of a coupling possessing a substantially cylindrical exterior surface and two straight, longitudinally uniform, bores each open to an opposed end, possessing a radially non-uniform feature resisting rotational displacement of an insert outer surface when in contact with the surface of one said bore, and each bounded by a wall possessing a substantially uniform thickness further possessing a longitudinal slot therethrough interrupting the circumferential extent of said wall and traversed by a threaded fastener associated with said bore;
   the provision of at least one radially compressible sleeve insert possessing; a straight, longitudinally uniform, insert outer surface possessing a radially non-uniform feature resisting rotational displacement of said insert outer surface when in contact with the surface of one said bore of said coupling, and a substantially cylindrical bore bounded by an insert wall possessing a substantially uniform wall thickness interrupted in circumferential extent by a circumferential gap, said radially non-uniform feature comprising one of the three following features:
   (1) a key extending radially outward from said insert outer surface fitting a key way extending into the surface of said bore of said coupling,
   (2) a flat extending into said insert outer surface, a congruent flat extending outward from said bore of said coupling and a key extending radially outward from said insert outer surface fitting a key way extending into the surface of said bore of said coupling,
   (3) six radially symmetrical flats extending into said insert outer surface and six congruent flats extending outward from said bore of said coupling;

said insert outer surface being congruent to and fitting within either said bore of said coupling having said associated threaded fastener in a loose condition;

whereby fitting said sleeve insert into one said bore of said coupling presents a reduced diameter bore comprised by said insert bore into which a rotary shaft of a reduced diameter with respect to the diameter of said bore of said coupling is readily fitted;

whereby tightening of said threaded fastener associated with one said bore of said coupling provides radial compression providing engagement of a rotary shaft inserted into said bore possessing a full diameter with respect to the diameter of said bore; and whereby tightening of said threaded fastener associated with one said bore of said coupling having said sleeve insert fitted therein provides radial compression of said sleeve insert and provides engagement of a rotary shaft possessing a reduced diameter with respect to said full diameter.

* * * * *